Sept. 3, 1968          P. G. IVANCHICH          3,399,580
MANUALLY CONTROLLED MULTIPLE RATIO POWER TRANSMISSON MECHANISM
FOR USE WITH AN AUTOMOTIVE VEHICLE DRIVELINE
Filed Jan. 26, 1967          8 Sheets-Sheet 1

Fig. 1

INVENTOR:
PETER G. IVANCHICH
ATTORNEYS

United States Patent Office 3,399,580
Patented Sept. 3, 1968

3,399,580
MANUALLY CONTROLLED MULTIPLE RATIO POWER TRANSMISSION MECHANISM FOR USE WITH AN AUTOMOTIVE VEHICLE DRIVELINE
Peter G. Ivanchich, Dearborn, Mich., assignor to Ford Motor Company, Dearborn, Mich., a corporation of Delaware
Filed Jan. 26, 1967, Ser. No. 611,908
15 Claims. (Cl. 74—331)

ABSTRACT OF THE DISCLOSURE

A manually controlled multiple ratio power transmission mechanism having multiple, geared, torque delivery paths and a common synchronizer clutch assembly for establishing and disestablishing each of the several torque delivery paths in response to a controlled movement of a common clutch element with respect to separate, companion clutch elements for each of several torque delivery gears.

Cross reference to related application

The improvements of my invention are adapted to be applied especially to a transmission structure of the type disclosed in my co-pending application Ser. No. 546,881, filed May 2, 1966. Reference may be made to that co-pending application for the purpose of supplementing this disclosure.

Brief summary of the invention

The improvement of my invention resides principally in an improved, selectively engageable clutch adapted to connect and disconnect the driven shaft of the transmission mechanism and each of several transmission drive gears as ratio changes are accomplished. The strategic disposition of this clutch makes it possible to establish and disestablish the torque delivery paths through the transmission structure thereby unloading the torque delivery gears during ratio changes.

This torque delivery interruption is accomplished in conventional transmission systems by employing a neutral clutch which is located between the crankshaft of the internal combustion engine and the power input shaft of the gearing of the transmission. I contemplate that such a neutral clutch can be eliminated entirely in my improved system thereby avoiding the space penalty normally incurred by the neutral clutch in conventional vehicle driveline systems and avoiding also the manufacturing costs associated with it.

The provision of a transmission mechanism of the type above described being a principal object of my invention, it is a further object of my invention to provide a multiple ratio power transmission mechanism wherein a common clutch structure is used to establish and disestablish a driving connection between each of the several torque delivery gears and the driven member of the transmission, and wherein provision is made for operating the clutch without experiencing high inertia forces due to differential speeds of the relatively movable elements of the gearing and without experiencing excessive friction forces as the clutch is engaged and disengaged.

It is a further object of my invention to provide an improved structure for use in a transmission of the type above set forth wherein the driven parts of the clutch structure are connected to a transmission driven shaft and wherein the power input elements of the clutch structure can be clutched selectively to each of several torque delivery gear elements arranged coaxially with respect to the axis of rotation of the clutch structure.

It is a further object of my invention to provide a clutch structure of the type set forth in the preceding object wherein provision is made for eliminating the friction forces that would normally tend to impede free relative sliding movement of the power input elements and the power output elements of the clutch structure during ratio changes.

It is a further object of my invention to provide a transmission mechanism having an improved clutch structure of the type above set forth wherein provision is made for synchronizing the motion of each of the several torque delivery gears with respect to the movable elements of the clutch structure prior to the completion of each of the several torque delivery paths.

It is a further object of my invention to provide a multiple ratio power transmission mechanism of the type above set forth wherein provision is made for reducing to a minimum the mass of the rotating elements of the system as one torque delivery path is interrupted and another is established.

It is another object of my invention to provide a transmission mechanism having a stationary housing adapted to be connected to the engine block of a vehicle engine in an automotive vehicle driveline and wherein the torque delivery elements of the transmission mechanism can be assembled as a unit in a preassembled condition within the housing during servicing and assembly operations.

Description of the views of the drawings

FIGURE 1A is an enlargement of a portion of the cross-sectional view of FIGURE 1. FIGURE 1A is taken along the plane of section line 1A—1A of FIGURE 1B.

Particular description of the invention

Figure 1:
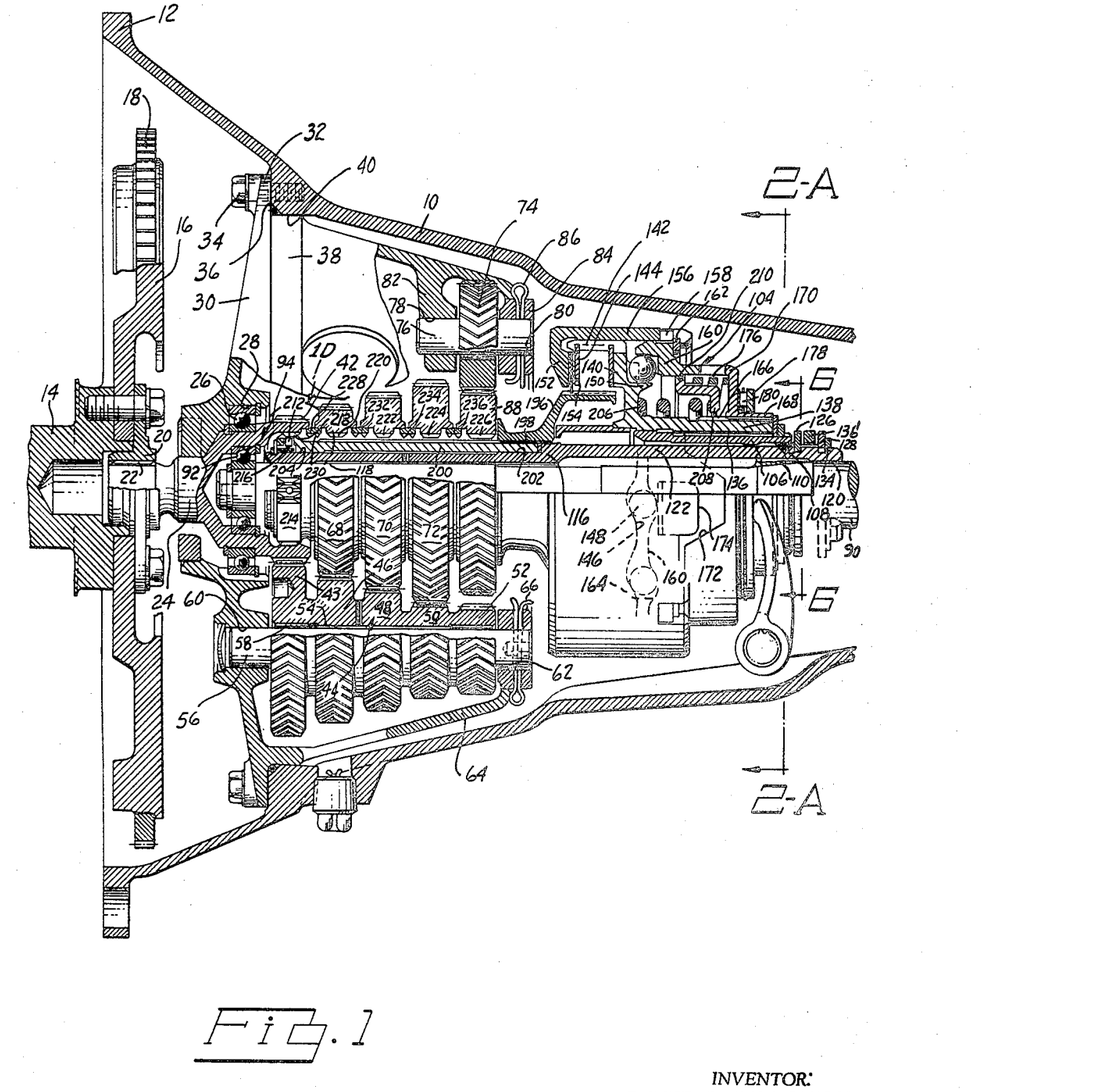
FIGURE 1 and FIGURE 2 show in longitudinal cross-sectional form a multiple ratio gearing arrangement embodying the improvements of my invention.
Figure 2:
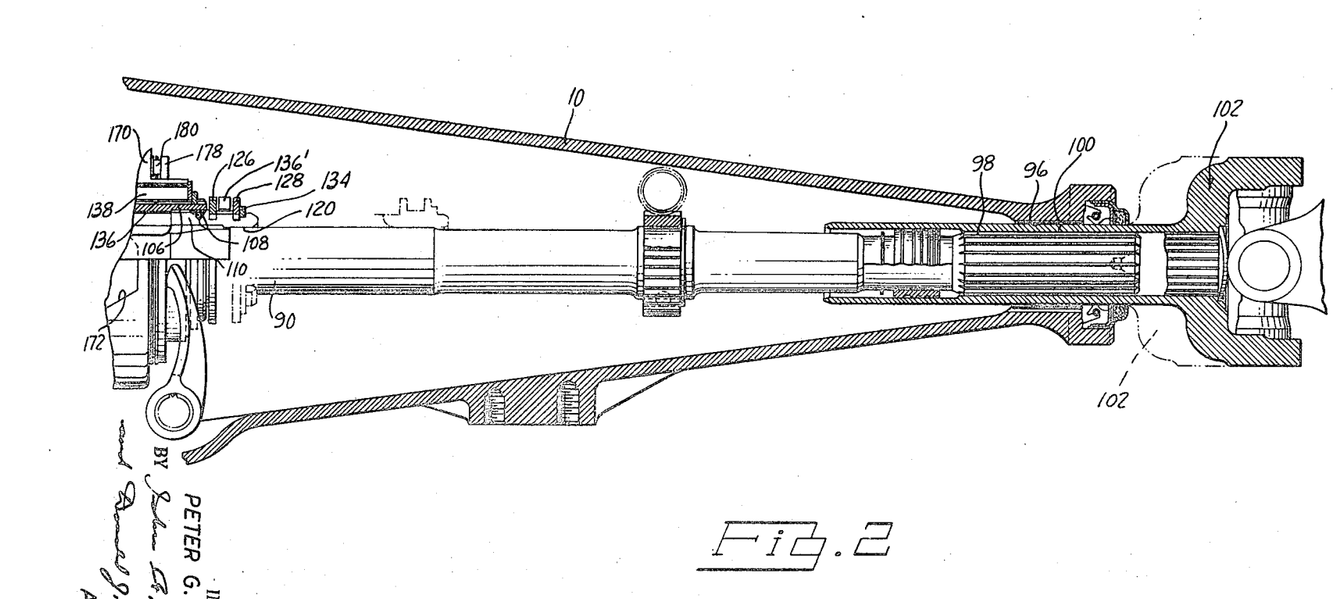

In FIGURES 1 and 2, numeral 10 designates the transmission housing. It is formed with a progressively decreasing cross section to create a positive draft angle. This makes it possible to diecast the housing 10 in one part. It permits also the assembly of the torque delivery gear elements as a unit within the housing during assembly and servicing operations.

The left-hand margin 12 of the housing 10, which is the margin of largest diameter, is adapted to be bolted to the engine block of an internal combustion vehicle engine. The crankshaft for the internal combustion engine is shown in part at 14. It is flanged to permit a bolted connection with an engine flywheel 16. An engine starter gear 18 is carried by the periphery of the flywheel 16 in the usual fashion.

Flywheel 16 includes a hub 20 which is splined at 22 to power input shaft 24. This shaft is journaled by a bearing 26 within a bearing opening 28 formed in a forward bearing support wall 30. The margin 32 of the wall 30 is bolted by bolt 34 to an internal shoulder 36 formed in the housing 10.

An axially extending shoulder 38 is piloted within an annular pilot surface 40 formed in the interior of the housing 10.

Power input gear 42 is connected directly to the power input shaft 24. It meshes directly with countershaft gear element 43 which forms a part of a cluster gear assembly 44. This assembly includes also companion gear elements 46, 48, 50 and 52.

Cluster gear assembly 44 is formed with a central, axially-extending opening 54 through which countershaft 56 is received. Bearings, one of which is shown at 58, journal the cluster gear assembly 44 on the shaft 56. One end of shaft 56 is received within countershaft opening 60 and supported by the wall 30. The other end of the shaft 60 is received within an opening 62 formed in an extension housing 64 which in turn is integrally formed with the wall 30 to form a unitary subhousing assembly. Shaft 56 is held axially fast by cotter key 66.

There are three cluster gear assemblies 44 situated in substantially equal angular increments about the axis of power input shaft 24. Each of them is a duplicate of the structure shown at 44 in FIGURE 1, and each includes a cluster countershaft corresponding to shaft 56. Each countershaft is end-supported by structure similar to the end supports for the shaft 56.

A first output gear 68 engages gear elements 46 of the cluster gear assemblies. Gear 68 is effective as a torque delivery element during operation in the third speed ratio as will be explained subsequently. Gear elements 48 of the cluster gear assemblies engage continuously intermediate speed ratio output gear 70. In a similar fashion gear elements 50 of the cluster gear assemblies engage continuously low speed ratio output gear 72.

Three reverse drive pinions, one of which is shown at 74, are journaled by the housing extension 64. Each pinion 74 is mounted on a reverse drive pinion shaft 76 which is then supported in openings 78 and 80 formed in the housing extension 64. Opening 78 is formed in boss 82 located internally of the housing extension 64. Opening 80 is formed in end wall 84 for the housing extension 64. Shaft 76 is held axially fast by cotter key 86.

By preference, there are three reverse drive pinions 74 situated in equal, angularly-spaced relationship about the axis of shaft 24. Each of them drivably engages continuously reverse drive output gear 88. They engage also reverse drive cluster gear element 52.

Output gears 68, 70 and 72 are rotatably supported by the engaging gear elements on the three cluster gear assemblies. No other supporting means is required for these gears. Output gear 88 is supported in a similar fashion by the engaging reverse drive pinions 74.

The gear teeth for the output gears 68, 70, 72 and 88, as well as the gear teeth of the cooperating cluster gear assemblies and the input gear 42, are herringbone gears with the apex of each chevron defined by the gears being situated generally on the mid-plane of the gear face. This gear arrangement permits torque delivery between the gears and the gear elements of the cluster gear assembly without any accompanying side thrust on the gears or on the cluster gear assemblies. Each mesh has a characteristic quietness in operation during torque delivery.

A transmission output shaft is shown at 90 in FIGURE 2. It extends axially through the housing 10 and is journaled at its forward end by bearing 92 within bearing opening 94 formed in input shaft 24 as seen in FIGURE 1. The right-hand end of shaft 90 is journaled by bushing 96 at the end of the extension shaft portion of the housing 10. This end of the shaft 90 is splined at 98 to the stem 100 of a universal joint shown generally at 102. This joint forms the universal driving connection with a drive shaft which in turn can be connected to a vehicle driving axle through a differential assembly in known fashion.

Figure 1A:
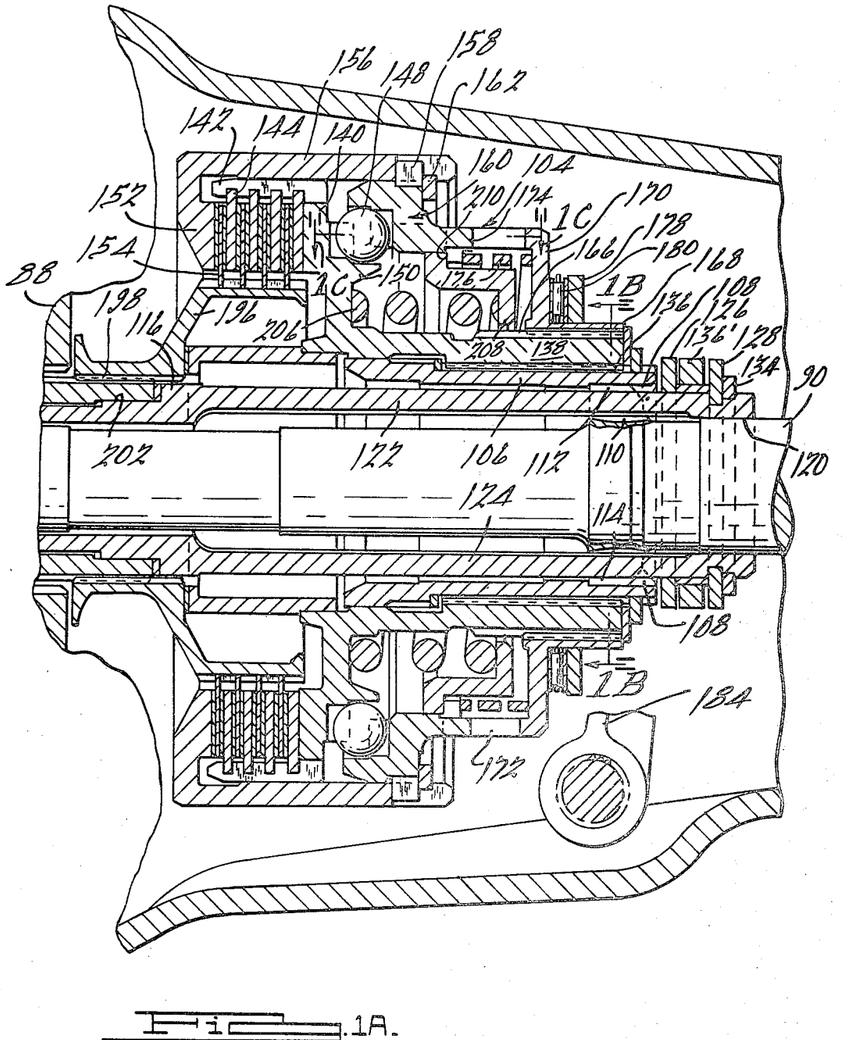
Figures 1B, 1C:
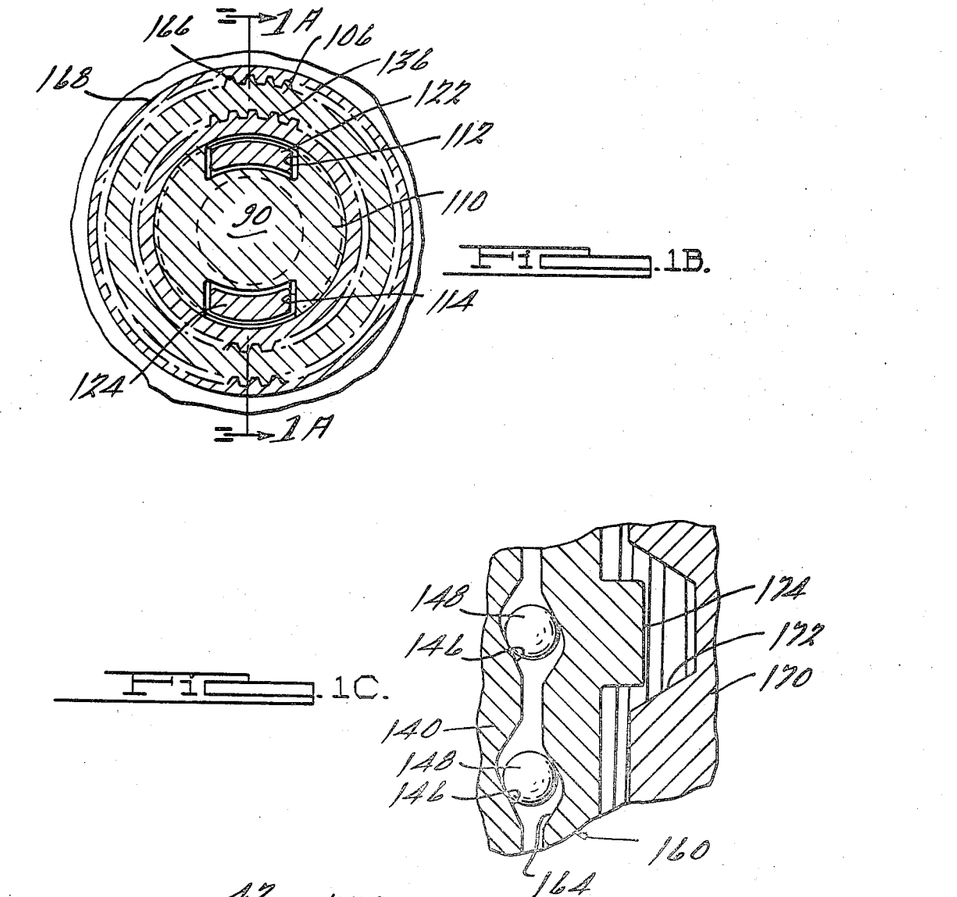
FIGURE 1B is a cross-sectional view taken along the plane of section line 1B—1B of FIGURE 1A.
FIGURE 1C is a cross-sectional view taken along the plane of section line 1C—1C of FIGURE 1A.
Figure 1D:
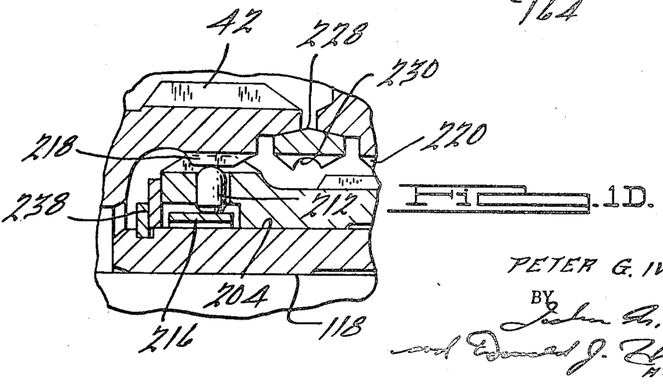
FIGURE 1D is an enlargement of the portion of FIGURE 1 that is encircled by the reference circle 1D.
Figures 3, 5:
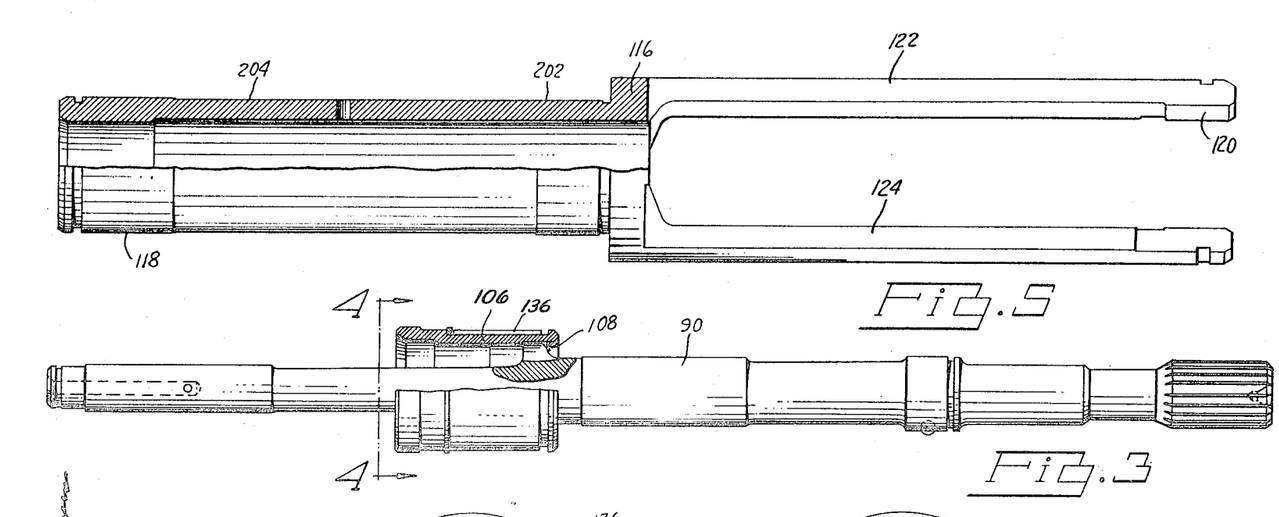
FIGURE 3 shows a detailed view of the transmission output shaft and a power output sleeve of the clutch assembly for the transmission.
FIGURE 5 is a detailed view of the selector shift sleeve used in the construction of FIGURES 1 and 2.
Figure 4:
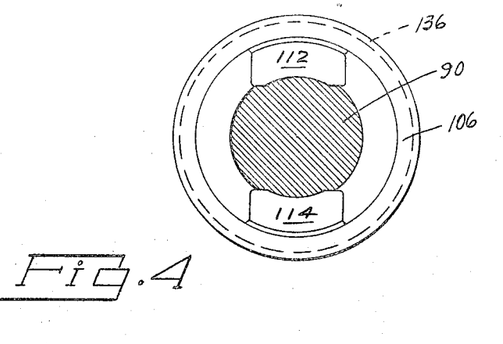
FIGURE 4 is a sectional view taken along the plane of section line 4—4 of FIGURE 3.

A control clutch assembly is indicated generally in FIGURES 1 and 1A by the reference character 104. It includes an externally splined sleeve 106 which surrounds the shaft 90 and which is secured by welding 108 to a flange 110 on the shaft 90. Flange 110 is formed with spaced radial openings. As best seen in FIGURE 4, these by preference are formed by a simple milling operation prior to assembly of the sleeve 106. The openings are identified in FIGURE 4 by reference characters 112 and 114. The assembly of the shaft 90 and the sleeve 106 is indicated in FIGURE 3.

Figure 6:
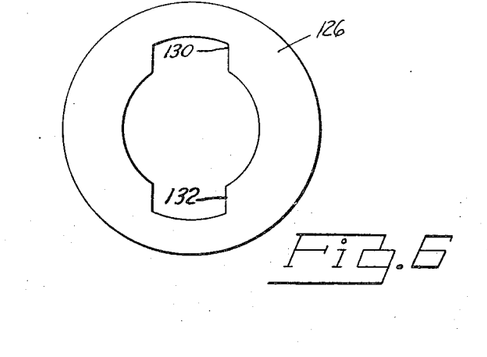
FIGURE 6 is an end view of the thrust element of the clutch structure seen in FIGURE 2.

The transmission sleeve 116 surrounds the shaft 90. It is supported slidably by the shaft 90 by means of internal bearing surfaces 118 and 120 formed on its opposite ends. Sleeve 116 is bifurcated to form two longitudinally extending arms 122 and 124 which extend through the milled openings 112 and 114 formed in the flange 110. A pair of axially spaced thrust rings 126 and 128 are carried by the right-hand extremity of the sleeve 116. The shape of the rings 126 and 128 can best be seen by referring to FIGURE 6 where the ring 126 is shown in side elevation. The arm 122 extends through internal recess 130 formed in the ring 126 and the arm 124 extends through a corresponding recess 132 situated 180° out of position with respect to the recess 130. Ring 128 is identical to ring 126. Ring 126 engages the flange 110 and the ring 128 engages and is held axially fast by snap ring 134.

The annular-shaped space located between the rings 126 and 128 is occupied by a driver-controlled shift ring 136'. This can be connected to a suitable driver-controlled shift linkage mechanism which I will describe subsequently. In this fashion the sleeve 116 can be moved axially with respect to the shaft 90.

The sleeve 106 is externally splined at 136 to the hub 138 of a clutch element 140. The outer margin 142 of the element 140 is internally splined to permit engagement with externally splined clutch discs 144. The radially extending part of element 140 is formed with cam recesses 146, each of which receives a cam ball 148. The balls are held against radial displacement by an annular shoulder 150.

A clamping clutch element 152 in the form of an annular clamping ring is situated at one side of the discs 144 and the cooperating internally splined discs 154. Ring 152 forms a part of a clutch drum 156, the right-hand margin of which is connected by means of clutch teeth 158 to a circular clutch element 160. Motion of the element 160 in a right-hand direction is restricted by snap ring 162.

Element 160 is provided with cam recesses 164, each of which receives one of the balls 148.

The hub 138 is externally splined at 166 to the internally splined hub 168 of a clutch operator element 170. This element is provided at its outer periphery with a series of cam recesses 172 having tapered sides, indicated best in FIGURE 2. These recesses receive projections 174 carried by the clutch element 160. The element 170 is normally biased in a right-hand direction from element 160 by a clutch spring 176.

If the element 170 is shifted in a left-hand direction so that the projections 174 register with the recesses 172, then element 160 will be rotated relative to element 170 if initially they are displaced angularly with respect to each other. When this occurs, the cam recess 164 will become aligned with corresponding cam rings 146. The element 170 can be shifted in a left-hand direction to a clutch disengaging position by a pressure ring or clutch release ring 178 surrounding the hub 168. A radial needle thrust bearing 180 can be used to transfer thrust forces from ring 178 to the element 170.

The thrust ring 178 is engaged by the ends of clutch release forks 182 and 184. The hub 186 of the clutch release fork is secured to clutch equalizer shaft 188. This shaft is journaled by oscillation in openings 190 and 192 formed in the housing 10. The extending end of the shaft 188 carries clutch release lever 194 which can be operated by the vehicle operator by means of a swivel clutch release lever and clutch pedal. The clutch release fork is returned to a clutch engaging position by the spring 176.

Internally splined clutch discs 154 are carried by an externally splined clutch element 196. This in turn is internally splined at 198 to a clutch sleeve 200 which is journaled for rotation on bearing surfaces 202 and 204 formed at spaced locations on the sleeve 116. The spline 198 is sufficiently loose to permit the sleeve 200 to slide freely through the clutch element 196.

A compression spring 206 is situated between clutch element 140 and a spring seat 208. This spring seat is anchored against a shoulder 210 carried by clutch element 160. Thus the force of spring 206 is effective normally to urge the clutch discs 154 and 144 into clutching engagement. If the clutch is distributing torque and the spring 206 causes initial engagement of the discs 144 and 154, the balls 148 and the associated cam recesses 164 and 146 will augment the clutch-applying force with a self-energizing action.

The left-hand end of the sleeve 200 is formed with a plurality of synchronizer plunger elements 212, as best seen in FIGURE 1. These are mounted for radial movement in radial openings formed in a synchronizer clutch element 214 carried by sleeve 200. This element is in the form of an externally splined synchronizer ring with the openings projecting radially through the teeth of the ring. A circular spring 216 normally urges the plungers 212 in an outward direction when they are positioned, as shown in FIGURE 1. Plungers 212 engage internal clutch teeth 218 formed in the gear 42. In the position shown in FIGURE 1, the clutch element 214 is in meshing engagement with the teeth 218, thereby causing a direct driving connection between shaft 24 and sleeve 200.

Each of the output gears is formed with internal clutch teeth that are similar to clutch teeth 218. These other clutch teeth are identified by reference characters 220, 222, 224 and 226 and are located, respectively, in gears 68, 70, 72 and 88. Located between each of the co-axially mounted gears is a synchronizer ring. The synchronizer ring between gears 42 and 68 is identified by reference character 228. It engages two conical clutch surfaces, one of which is formed on gear 42 and the other of which is formed on gear 68. The interior of synchronizer ring 228 is internally splined so that it can register with the external clutch teeth for element 214. An annular recess 230 is formed in the internal teeth of ring 228. This registers with plunger 214 as sleeve 200 is shifted in a right-hand direction from the position shown in FIGURE 1.

Corresponding synchronizer rings are located between each of the other pairs of gears as indicated at 232, 234 and 236. These may be identical in form to the ring 228.

As the operator shifts the sleeve 116 in a right-hand direction from the position shown in FIGURE 1, clutch element 214 disengages gear 42 and the external teeth of element 214 tend to mesh with the internal teeth of ring 228. When plunger 212 engages the recess 230, gear 42 is fully disengaged and further shifting effort of the sleeve 116 in a right-hand direction will cause a right-hand thrust on the ring 228, thereby engaging the cone surface on the gear 68. This thrust is imparted to the clutch element 214 by reason of a thrust washer connection between sleeves 200 and 216, as indicated at 238. The motion of the gear 68 will apply a torque to sleeve 200, thereby tending to establish a synchronizing torque that will overcome the inertia due to the differential speeds of sleeve 200 and gear 68. This synchronizing action is characterized by reduced inertia forces because of the reduced mass of the rotating sleeve 200 and the associated clutch element 196.

A corresponding synchronizer clutching action will occur during continued movement of the sleeve 116 in a right-hand direction as gears 70, 72 and 88 are engaged. In each case the synchronizing action occurs by reason of the thrust imparted to the rings 228, 232, 234 and 236 by the detent plungers 212. After synchronism occurs, clutch element 214 and the associated gear rotate at the same speed, thereby permitting the internal teeth of the gears to be engaged without undue harshness or clashing.

To condition the mechanism for low speed ratio operation, the sleeve 116 is shifted until the internal clutch teeth 224 are engaged by the clutch element 214. Under these conditions engine torque will be delivered from shaft 14 and through input gear 42 to the cluster gear assembly. Cluster gear element 50 will drive gear 72, which in turn will drive sleeve 200 and clutch element 196. The torque is transmitted through engaged clutch discs 144 and 154 to clutch element 140. Torque then is transferred from element 140 through splines 136 to the sleeve 106, which in turn is connected directly to the output shaft 90.

To obtain a ratio shift from the low speed ratio to the second speed ratio, the operator depresses the clutch pedal, which will cause the thrust ring 178 to move in a left-hand direction, as viewed in FIGURE 2. This will cause the projection 174 to register with the recesses 172, thereby relieving the camming action of the balls 148. This relieves the clutch applying force on the clutch discs 142 and 144, thereby disengaging the clutch element 196 from the clutch element 140. When the torque delivery path is interrupted in this fashion, the operator can shift the sleeve 116 in a left-hand direction until element 214 engages gear 70. Before it does this, however, synchronizer ring 234 establishes synchronism between the motion of gear 70 and the motion of sleeve 200. The operator then can re-engage the clutch by causing the clutch equalizer shaft 188 to rotate in the opposite direction. This relieves the pressure on ring 178 and the spring 206 then tends to urge the pressure ring 152 toward the clutch element 140 to apply initially the clutch discs 142 and 144. As soon as engagement takes place, the self-energizing action of the cam recess 164 and the cam balls 148 augments the clutch applying force, thereby locking the element 196 to the element 140. Torque then is distributed directly to the output shaft through hub 138, spline 136 and sleeve 106.

During torque delivery and during ratio changes, the sleeve 116 is not required to transmit torque. Thus it can be moved freely by the vehicle operator without any interference due to excessive friction forces.

Third speed ratio is accomplished by shifting the clutch element 214 into engagement with the gear 68 during the period in which the clutch discs 144 and 154 are disengaged. Synchronizer clutch ring 232 establishes synchronism between the motion of sleeve 200 and the gear 68 prior to the completion of the shift.

Once the synchronizer clutch element 214 is in a neutral position between the gears 70 and 68 and the plungers 212 are in engagement with the internal groove of the ring 232, a synchronizing action will occur regardless of the subsequent direction of shifting movement of the sleeve 200. If the sleeve 200 is downshifted again to effect engagement of the gear 70 rather than upshifted to effect engagement of gear 68, ring 232 will establish synchronism in that case between the motion of sleeve 200 and the motion of gear 70. The other synchronizer rings cooperate with the plungers 212 in the same fashion. Thus each synchronizing ring is effected to establish synchronism on both upshifts and downshifts of the clutch element 214 from the neutral position intermediate the two associated power output gears.

Direct drive, as mentioned earlier, is obtained by shifting the sleeve 116 to the position shown in FIGURE 1 so that power input shaft 24 is connected then directly to sleeve 200 and clutch element 196.

Reverse drive is obtained by shifting the sleeve 116 so that element 214 engages gear 88. Engine torque then is delivered from shaft 24 to the cluster gear assembly through gear 42. Torque then is delivered from gear element 52 to the pinions 74 which in turn drive gear 88. The torque then is transferred through element 214 and sleeve 200 to the clutch element 196. When the clutch is engaged, a mechanical connection is established therethrough between element 196 and the power output shaft 90.

In each power flow path associated with several output gears, the ratio shift sleeves and the associated clutch elements are isolated from the torque delivery train. Sleeve 116 is not subjected to driving at any time regardless of which power output gear is effected. Shifting movement from one ratio to the other thus is not encumbered.

Figure 2A:
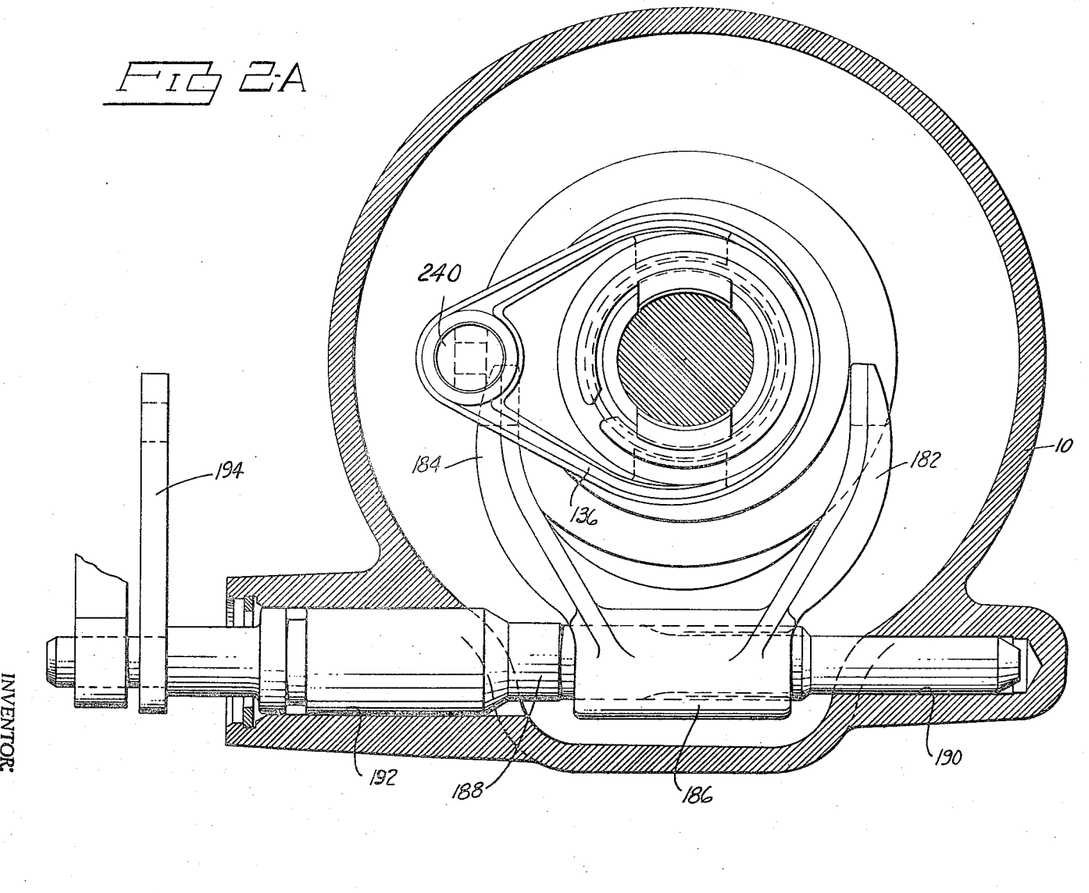
FIGURE 2A is a transverse sectional view taken along the plane of section line 2A—2A of FIGURE 1.

The shift ring 136 can be fixed, as seen in FIGURE 2A, to a shift rail 240 slidably mounted in a boss in the housing 10. The rail can be shifted in the direction of the axis of the shaft 90 by a suitable driver-controlled shift linkage mechanism.

Figure 7:
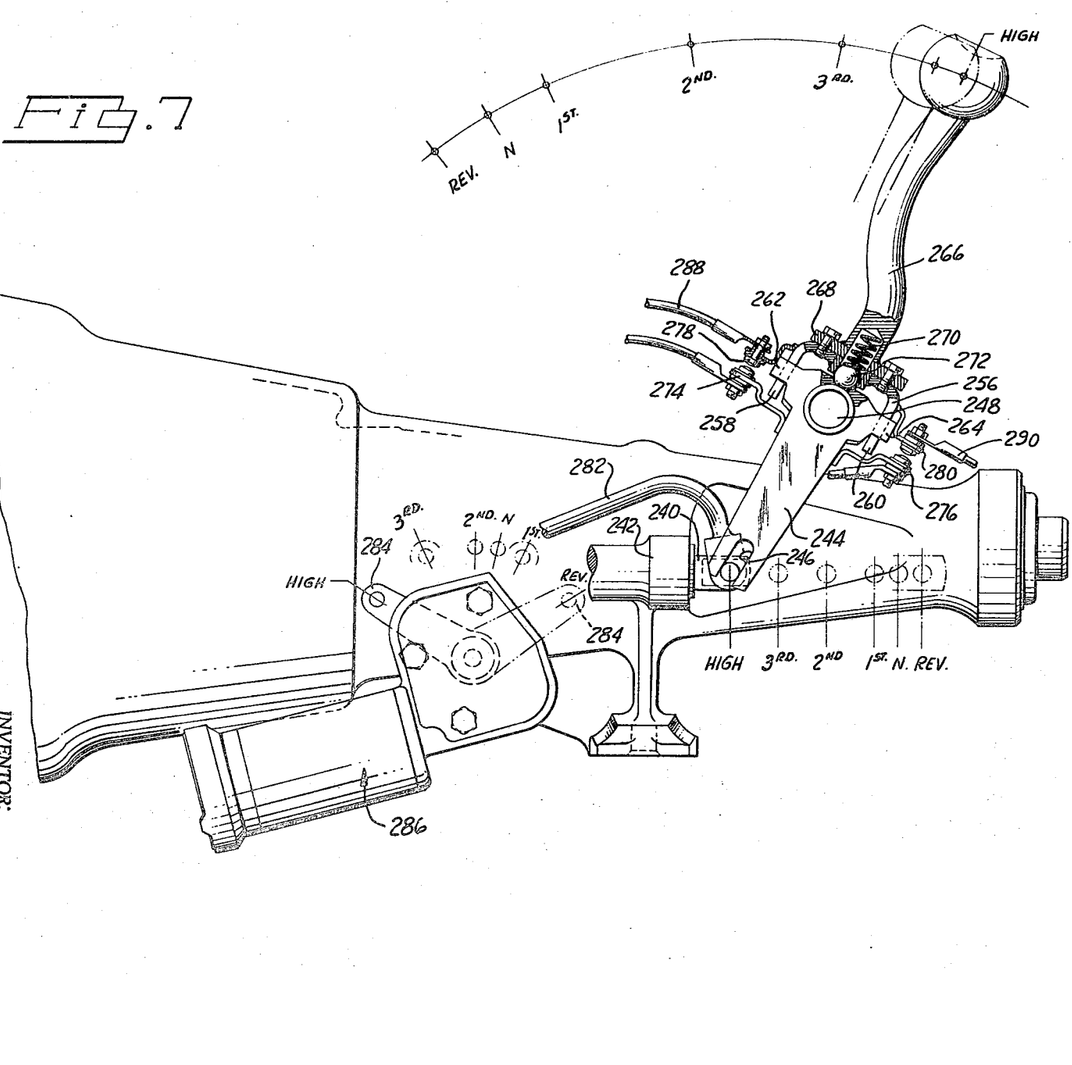
FIGURE 7 is a side elevation view of the transmission structure shown in FIGURES 1 and 2, together with one form of ratio selector lever mechanism.
Figure 8:
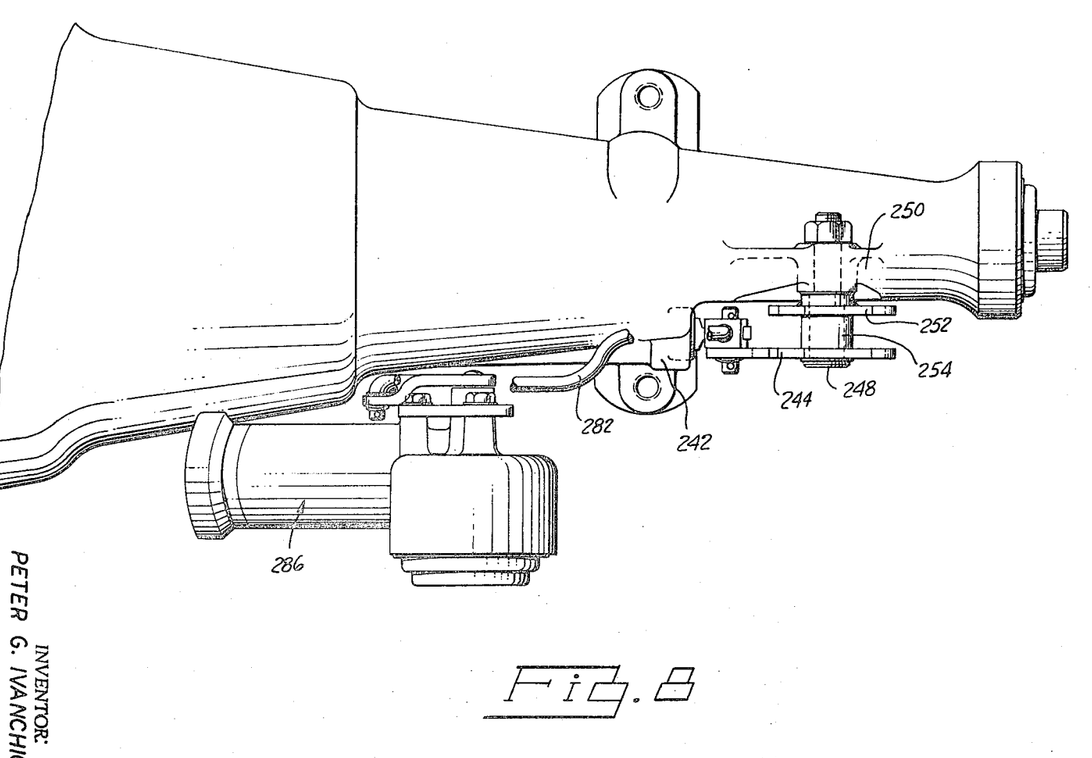
FIGURE 8 is a plan view of the structure shown in FIGURE 7.

One shift mechanism which can be used successfully is illustrated in FIGURES 7 and 8. The boss in which the shaft 240 is slidably mounted is indicated in FIGURES 7 and 8 by reference character 242. The outwardly extending end of the shaft 240 is connected to the lower end of a lever 244 by means of a pin and slot connection 246. The lever 244 is journaled in turn on a stationary pivot shaft 248 which is carried by the boss 250 formed on the exterior of the tailshaft extension housing portion.

A side plate 252 is mounted over the shaft 248 and is spaced from the lever 244 by a spacer 254. Lever 244 and plate 252 rotate together. A U-shaped mounting bracket 256 straddles the shaft 248 and the upper end of the lever 244. The arms 258 and 260 of the bracket 256 are apertured to receive projections 262 and 264 on the lever 244.

A gear shift lever 266 is mounted on the bracket 256. Lever 266 includes a base 268 which can be bolted or otherwise secured to the bracket 256. The spring 270 at the base of the gear shift lever 266 engages the ball seat 272, which in turn engages the spacer 254 to urge bracket 256 in a radially outward direction with respect to the axis of the shaft 248. This causes one end of the openings in the legs 256 and 260 to engage normally the projections 262 and 264, respectively.

Electrical switch contacts 274 and 276 are fixed to the lever 244. These are adapted to register with cooperating switch contacts 278 and 280, respectively. When the gear shift lever 266 is in the inactive position, shown in FIGURE 7, the contacts 274 and 278 are in an open circuit position. The same is true for the contacts 276 and 280.

Lever 244 is connected to a power booster rod 282 by means of a pivot connection that is common to the pin and slot connection 246. One end of the rod 282 is connected to servo lever 284 which forms a power output element of an electric servo motor 286. The armature of the motor 286 is connected to electric leads 288 and 290. An electric voltage source is connected to contacts 276 and 274 through a clutch pedal operated switch. Thus when the clutch pedal is in a clutch release position, the contacts 276 and 274 are energized. They are de-energized, however, when the clutch is engaged.

When the operator moves the gear shift lever 266 in a clockwise direction, mounting bracket 256 tends to pivot on the projection 262 and contact 280 engages contact 276. Contacts 280 and 278 both are fixed to the bracket 256.

The electric motor circuit of the motor 286 then is closed to cause the motor to shift the shift sleeve 116 in a left-hand direction. When the operator shifts the gear shift lever 266 in a counterclockwise direction, as viewed in FIGURE 7, contacts 278 and 274 are closed and contacts 280 and 276 are opened. This causes a reversal in the direction of the operation of motor 286, thereby causing the gear shift sleeve 116 to shift in a right-hand direction.

Although I have shown a power shift mechanism of a particular construction in FIGURES 7 and 8. I contemplate that manual, mechanical shifts also can be used to effect shifting movement of the shaft 240 during ratio changes.

Having thus described a preferred form of my invention, what I claim and desire to secure by U.S. Letters Patent is:

1. A power transmission mechanism comprising coaxially aligned power input and power output shafts, a power input gear connected to said power input shaft, multiple power output gears arranged coaxially with respect to said power output shaft, multiple cluster gear assemblies mounted for rotation about axes parallel to the axis of the power output shaft, said cluster gear assemblies having gear elements engageable continuously with said power output gears, a shift sleeve surrounding said power output shaft, a clutch sleeve surrounding said shift sleeve and rotatable with respect thereto, a synchronizer clutch element carried by said clutch sleeve, internal clutch teeth formed in each of said power output gears, said clutch sleeve being held axially fast with respect to said shift sleeve and movable into selective clutching engagement with the internal clutch teeth of said output gears upon shifting movement of said sleeve in the direction of the axis of said output shaft.

2. A power transmission mechanism adapted to deliver driving torque from a driving shaft to a driven shaft, a plurality of power output gears arranged coaxially with respect to said driven shaft, multiple cluster gear assemblies mounted rotatably about axes parallel to the axis of said power output shaft, a geared connection between said power input shaft and said cluster gear assemblies engaging continuously said power output gear, a clutch sleeve extending through said power output gears and carrying external clutch teeth, internal clutch teeth formed in each of said power output gears, a transmission shift sleeve surrounding said power output shaft, a connection between said shift sleeve and said clutch sleeve adapted to shift the latter in unison with axial shifting movement of said clutch sleeve although relative rotation therebetween is permitted, a selectively engageable friction clutch having a power input clutch element and a power output clutch element, means for connecting drivably said clutch sleeve to one of said clutch elements, means for securing the other clutch element to said power output shaft, said clutch sleeve being movable axially with respect to the axis of said power output shaft when said friction clutch is disengaged, and clutch operator means for applying and relieving a clutch actuating force on said clutch elements during axial shifting motion of said clutch sleeve.

3. A geared power transmission mechanism adapted to deliver driving torque from a power input shaft to a power output shaft which are aligned axially, a plurality of cluster gear assemblies mounted for rotation about axes parallel to the axis of said power output shaft, power output gears rotatably supported for rotation about the axis of said output shaft, each of said output gears having internal clutch teeth and engaging separate gear elements of said cluster gear assemblies whereby they are rotatably supported in free-floating relationship with respect to said cluster gear assemblies, a geared connection between said power input shaft and said cluster gear assemblies, a clutch sleeve extending through said output gears and carrying thereon external clutch teeth, a shift sleeve surrounding said output shaft, internal clutch teeth formed on each of said gears adapted to engage said external clutch teeth, a selectively engageable friction clutch having a torque input element, a torque output element, said shift sleeve being connected to one of said clutch elements, means for securing the other clutch element directly to said output shaft, said clutch having engageable friction discs carried by said clutch elements, a clamping disc situated adjacent said discs, means for applying a clamping pressure to said clamping disc thereby effecting clutching engagement of said clutch elements to establish a driving connection between said shift sleeve and said output shaft, personally operable means for overruling the clutch engaging means to effect a torque interruption in said driveline, and means for shifting said sleeves axially during torque interruption of said torque delivery driveline to thereby effect ratio changes.

4. The combination as set forth in claim 3 wherein said shift sleeve is slidably mounted on said output shaft and shiftable relative to the axis of said output shaft, said shift sleeve being independent of the torque delivery elements of said driveline.

5. The combination as set forth in claim 1 wherein the torque delivery elements of said driveline include a separate synchronizer ring situated between each adjacent pair of output gears, synchronizer clutch surfaces formed on said synchronizer rings and cooperating synchronizer clutch surfaces formed on said output gears, said shift sleeve comprising a synchronizer detent element engageable selectively with said synchronizer rings as said shift sleeve is moved axially whereby an axial synchronizer thrust force is imparted to said synchronizer rings, thereby establishing synchronism between the motion of each of said output gears and the motion of said shift sleeve upon engagement of the clutch teeth of said clutch sleeve with the internal clutch teeth of said output gears.

6. The combination as set forth in claim 2 wherein the torque delivery elements of said driveline include a separate synchronizer ring situated between each adjacent pair of output gears, synchronizer clutch surfaces formed on said synchronizer rings and cooperating synchronizer clutch surfaces formed on said output gears, said shift sleeve comprising a synchronizer detent element engageable selectively with said synchronizer rings as said shift sleeve is moved axially whereby an axial synchronizer thrust force is imparted to said synchronizer rings, thereby establishing synchronism between the motion of each of said output gears and the motion of said shift sleeve upon engagement of the clutch teeth of said clutch sleeve with the internal clutch teeth of said output gears.

7. The combination as set forth in claim 3 wherein the torque delivery elements of said driveline include a separate synchronizer ring situated between each adjacent pair of output gears, synchronizer clutch surfaces formed on said synchronizer rings and cooperating synchronizer clutch surfaces formed on said output gears, said shift sleeve comprising a synchronizer detent element engageable selectively with said synchronizer rings as said shift sleeve is moved axially whereby an axial synchronizer thrust force is imparted to said synchronizer rings, thereby establishing synchronism between the motion of each of said output gears and the motion of said shift sleeve upon engagement of the clutch teeth of said clutch sleeve with the internal clutch teeth of said output gears.

8. The combination as set forth in claim 4 wherein the torque delivery elements of said driveline include a separate synchronizer ring situated between each adjacent pair of output gears, synchronizer clutch surfaces formed on said synchronizer rings and cooperating synchronizer clutch surfaces formed on said output gears, said shift sleeve comprising a synchronizer detent element engageable selectively with said synchronizer rings as said shift sleeve is moved axially whereby an axial synchronizer thrust force is imparted to said synchronizer rings, thereby establishing synchronism between the motion of each of said output gears and the motion of said shift sleeve upon engagement of the clutch teeth of said clutch sleeve with the internal clutch teeth of said output gears.

9. The combination as set forth in claim 2 wherein said friction clutch comprises a clutch clamping element secured to said driven shaft and axially movable with respect to said driven shaft, cam recesses formed in one of said clutch elements, cooperating cam recesses formed in said movable clutch element, cam elements engageable with said recesses whereby an axially directed clutch engaging force is applied to said clutch as a force component of the torque delivered through said clutch to said driven shaft.

10. The combination as set forth in claim 3 wherein said friction clutch comprises a clutch clamping element secured to said driven shaft and axially movable with respect to said driven shaft, cam recesses formed in one of said clutch elements, cooperating cam recesses formed in said movable clutch element, cam elements engageable with said recesses whereby an axially directed clutch engaging force is applied to said clutch as a force component of the torque delivered through said clutch to said driven shaft.

11. The combination as set forth in claim 4 wherein said friction clutch comprises a clutch clamping element secured to said driven shaft and axially movable with respect to said driven shaft, cam recesses formed in one of said clutch elements, cooperating cam recesses formed in said movable clutch element, cam elements engageable with said recesses whereby an axially directed clutch engaging force is applied to said clutch as a force component of the torque delivered through said clutch to said driven shaft.

12. The combination as set forth in claim 5 wherein said friction clutch comprises a clutch clamping element secured to said driven shaft and axially movable with respect to said driven shaft, cam recesses formed in one of said clutch elements, cooperating cam recesses formed in said movable clutch element, cam elements engageable with said recesses whereby an axially directed clutch engaging force is applied to said clutch as a force component of the torque delivered through said clutch to said driven shaft.

13. The combination as set forth in claim 6 wherein said friction clutch comprises a clutch clamping element secured to said driven shaft and axially movable with respect to said driven shaft, cam recesses formed in one of said clutch elements, cooperating cam recesses formed in said movable clutch element, cam elements engageable with said recesses whereby an axially directed clutch engaging force is applied to said clutch as a force component of the torque delivered through said clutch to said driven shaft.

14. The combination as set forth in claim 7 wherein said friction clutch comprises a clutch clamping element secured to said driven shaft and axially movable with respect to said driven shaft, cam recesses formed in one of said clutch elements, cooperating cam recesses formed in said movable clutch element, cam elements engageable with said recesses whereby an axially directed clutch engaging force is applied to said clutch as a force component of the torque delivered through said clutch to said driven shaft.

15. The combination as set forth in claim 8 wherein said friction clutch comprises a clutch clamping element secured to said driven shaft and axially movable with respect to said driven shaft, cam recesses formed in one of said clutch elements, cooperating cam recesses formed in said movable clutch element, cam elements engageable with said recesses whereby an axially directed clutch engaging force is applied to said clutch as a force component of the torque delivered through said clutch to said driven shaft.

References Cited

UNITED STATES PATENTS

| | | | |
|---|---|---|---|
| 1,947,033 | 2/1934 | Bush | 74—372 |
| 2,807,340 | 9/1957 | Butterworth | 74—372 |
| 2,971,403 | 2/1961 | Butterworth | 74—371 |
| 3,283,613 | 11/1966 | Perkins | 74—331 |

FOREIGN PATENTS 653,328   5/1951   Great Britain.

FRED C. MATTERN, Jr., *Primary Examiner.*

H. S. LAYTON, *Assistant Examiner.*